Jan. 20, 1953          H. G. BECK          2,625,716

FLEXIBLE WINDSHIELD MOUNTING

Filed Jan. 14, 1950          2 SHEETS—SHEET 1

INVENTOR
Howard G. Beck
BY Evans + Meloy
ATTORNEYS

Jan. 20, 1953 H. G. BECK 2,625,716
FLEXIBLE WINDSHIELD MOUNTING
Filed Jan. 14, 1950 2 SHEETS—SHEET 2

INVENTOR
*Howard G. Beck*
BY *Evans & McCoy*
ATTORNEYS

Patented Jan. 20, 1953

2,625,716

UNITED STATES PATENT OFFICE 2,625,716

FLEXIBLE WINDSHIELD MOUNTING

Howard G. Beck, Wabash, Ind., assignor to The General Tire and Rubber Company, Akron, Ohio, a corporation of Ohio Application January 14, 1950, Serial No. 138,671

12 Claims. (Cl. 20—56.4)

This invention relates to improvements in mountings for sealing and glazing two panels together and relates in particular to mountings intended for use in connection with windows and windshields on motor vehicles.

Most mountings now used to join adjacent panel edges in building and assembly work, such as mounting the window of an automobile in the automobile body, consist of two separate pieces, the linear mounting and the linear filler or wedge strip. To assemble these mountings, the mounting must be fitted into position so that the panel edges are in the mounting grooves and then the separate wedge strip must be brought up and aligned with the longitudinal wedge receiving opening in the mounting and finally it must be pressed into position to seal and lock the panel edges in place. As might be expected, difficulty is often encountered in aligning the wedge strip with the longitudinal opening in the mounting and in holding it in the aligned position. This delays and complicates the assembly process and decreases the value of this type of mounting.

A second difficulty now encountered in assembling two-piece mountings is that as the separate wedge strip is forced and pulled into the longitudinal opening in the mounting by its special tool, the wedge strip is further elongated and diminished in cross-section so that it does not fit as snugly in the longitudinal opening as it should. This is particularly the case when the wedge strip is compounded to possess high resilience as when it is gum or lightly loaded rubber compound. To correct this difficulty the wedge strip is made of a harder and more heavily loaded rubber. This heavy loading in turn reduces the elasticity and flexibility of the wedge strip.

A particular object of the present invention is to provide a mounting which has a locking or wedging element integral with the mounting which is easily located and positioned and which does not elongate when pressed into the locking position.

Another object of this invention is to provide a flexible mounting which can be extruded and supplied in one piece for facile assembly.

Still another object of this invention is to provide a method of incorporating window glass in openings in panels whereby the window glass is resiliently held in said openings.

Other objects will be apparent from the following description of the invention as illustrated by the accompanying drawings in which.

The construction of the mountings can be readily observed by referring more particularly to the drawings in which like parts are denoted by like numerals of reference throughout.

Figure 1:
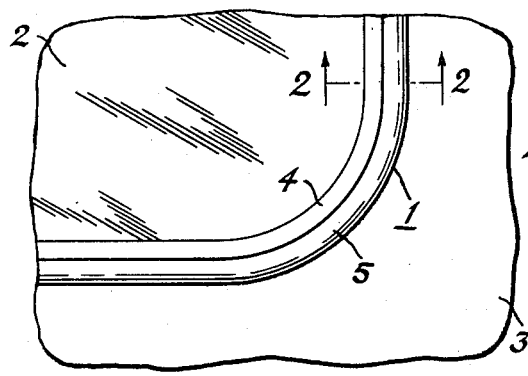
Figure 1 is a view of two panels joined together by this mounting. In this case, the central panel is an automobile window glass and the outer panel is the body of a motor vehicle.

The linear mounting or seal 1 assembled with the two panels, the automobile window 2 and the automobile body 3, is shown in Fig. 1. This view shows the neat external appearance which this mounting gives and also shows the flexibility of the mounting in that it follows the window glass corner. In the enlarged sectional view of Fig. 2, the window glass 2 or left hand panel, and the vehicle body 3, or right hand panel, are firmly held in place by the sealing flanges 4, 5, 6 and 7 of the mounting which are respectively connected by a central connecting portion 8 (Fig. 4) into the general shape of a horizontal H section. In the unassembled form of Fig. 4, the flanges 4 and 6 form with the connecting portion 8 the panel receiving groove 9 and the flanges 5 and 7 form with the opposite side of connecting portion 8 the panel receiving groove 10. The panel edges are fitted into these grooves prior to fitting or locking the mounting in place. The flanges 4, 5, 6 and 7 have concave or convergent inner faces 24, 25, 26 and 27, respectively, so that the grooves 9 and 10 formed by pairs of these faces are generally convergent when the flanges grip the panels 2 and 3, and the outer edges of the flanges will then exert as much or more gripping force than the inner edges and provide a firm and watertight seal.

Figure 2:
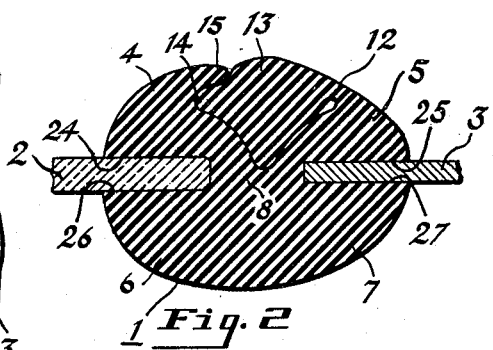
Fig. 2 is an enlarged cross-section on line 2—2 of Fig. 1 showing the mounting as assembled firmly gripping the edge portions of the panels.

The flange portions 6 and 7 on one side of the median plane through the grooves 9 and 10 are movable toward each other with difficulty because for any motion the rubberlike material therebetween must be compressed. These flanges consequently tend to resist any movements relative to each other. Flanges 4 and 5 also referred to as wing portions on the other side of the median plane are relatively freely movable toward each other because of the longitudinal opening groove, or cavity 11. In other words, the flanges 4 and 5 move toward each other easily because there is no mass of rubberlike material between them to resist this movement. This allows the grooves 9 and 10 to open to receive the panel edges when the mounting is in the unlocked position of Fig. 4. When on the other hand the mounting or seal is in the locked position, as shown in Fig. 2, pressure of the flanges 4 and 5 against the panel surfaces applies tension to the connecting portion 8 which causes the flanges 6 and 7 to bear strongly against the opposite side of the panels 4 and 3, respectively.

In accordance with the present invention, a wedge element or filler 13 that is coextensive in length with the body of the seal is hinged integrally with the mounting along one edge of the longitudinal opening 11. This hinge or pivot 12 should be relatively short as shown to provide a localized or line pivot effect, so that it resists movement in a longitudinal direction and it will restrain elongation of the wedge element 13 relative to the body of the seal. The line pivot effect of the hinge 12 therefore aligns the filler 13 accurately with the longitudinal opening 11. This filler is so formed that, after the panels 2 and 3 have been fitted into the panel receiving grooves 9 and 10, it can be pressed into the longitudinal opening 11 to fill up the opening with a bulk of resilient rubberlike material and to force the flanges 4 and 5 down upon the panels 2 and 3 and hold them firmly but resiliently in position.

Figure 3:
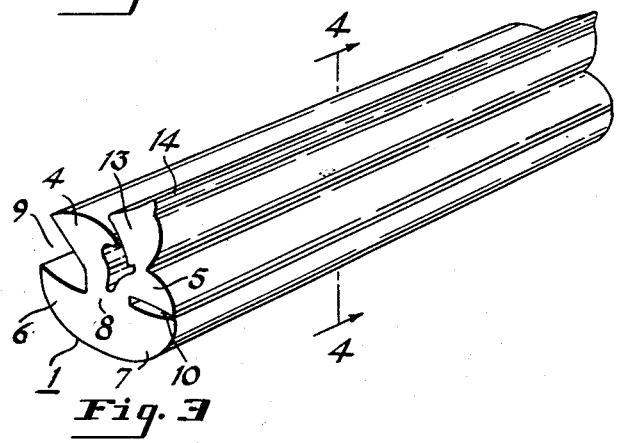
Fig. 3 is a perspective view of the linear mounting of this invention as extruded and supplied for assembly.
Figure 4:
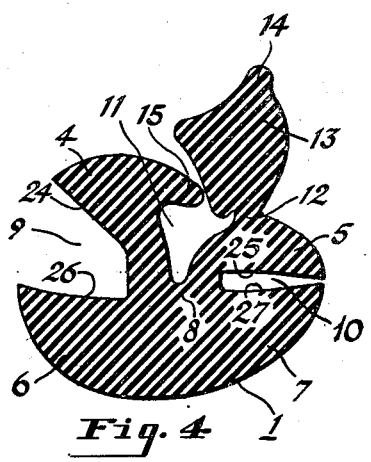
Fig. 4 is an enlarged cross-section on line 4—4 showing one form of the mounting prior to assembly.

The longitudinal opening and wedge element or strut portion are shaped and proportioned relative to each other to interfit. The modification of Figs. 2, 3 and 4 shows a wedge-shaped element with a bead 14 along the outer side opposite from the line like hinge 12. The bead 14 fits under the lip 15 when the wedge 13 is forced into the locked position, as illustrated in Fig. 2. This is the usual shape employed because it most nearly approximates a wedge and acts as such. The strut portion is also preferably provided with arcuate bearing portions on the side opposite from the hinge to mate with the corresponding portions in the groove.

Figure 5:
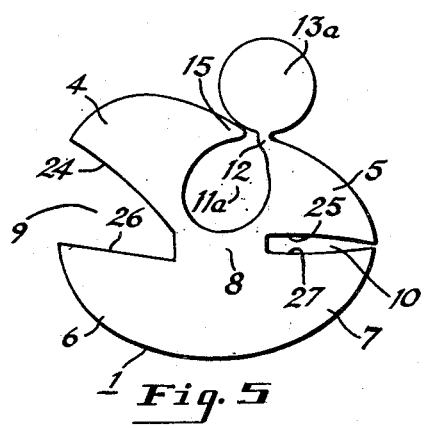
Fig. 5 is a cross-section of a modification of the mounting of this invention.
Figure 6:
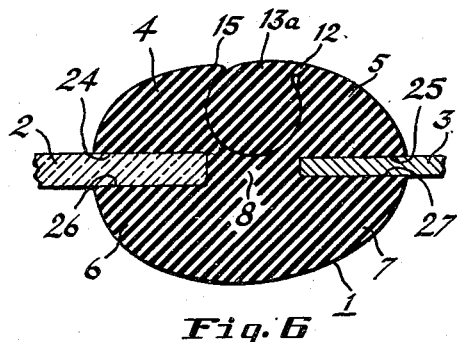
Fig. 6 is a cross-section of the modification of Fig. 5 as assembled and locked in position.

In the modification of Figs. 5 and 6 a generally cylindrical or ovate filler 13a is used in place of the wedge 13 of Figs. 1 to 4. The cavity or longitudinal opening 11a is shaped and proportioned to receive the cylindrical filler 13. It is locked in place by the lip 15. This modification has some advantages in manufacture and the filler is easier to fit and press into place.

Figure 7:
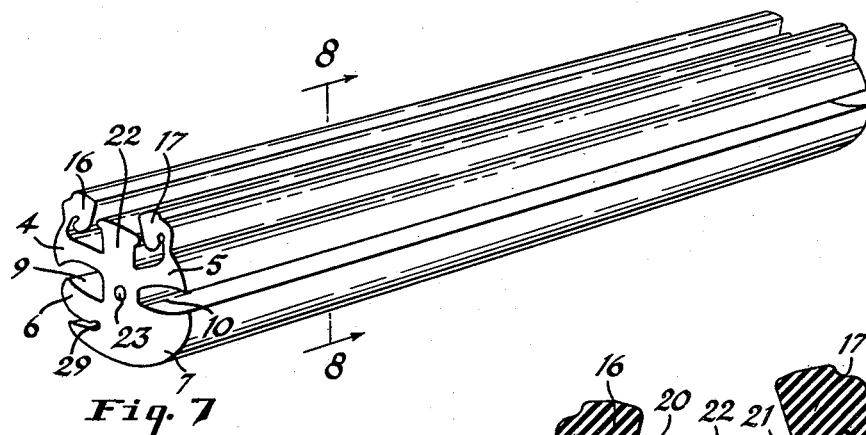
Fig. 7 is a perspective view of a modification of this invention with two opposing pressure elements.
Figures 8, 9:
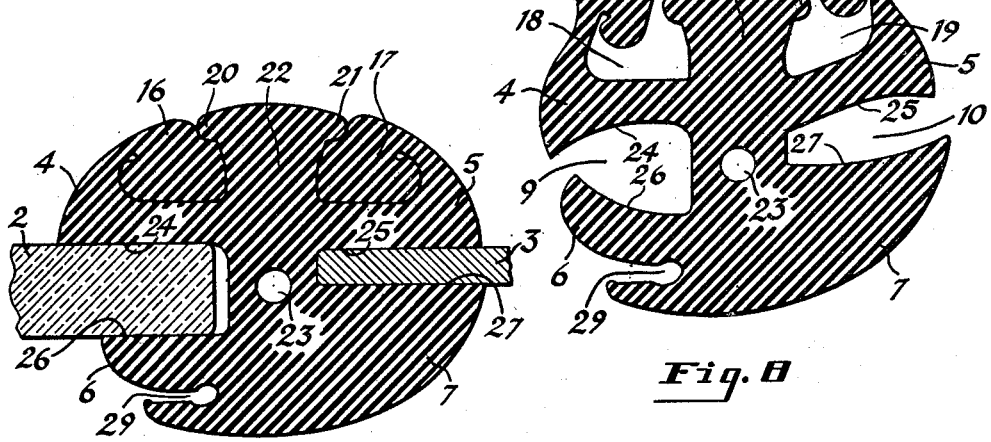
Fig. 8 is an enlarged cross-section taken on line 8—8 in Fig. 7 of this modification.
Fig. 9 is a cross-section of the modification of Fig. 7 as assembled and locked in position.

Two filler elements 16 and 17 and two corresponding longitudinal openings 18 and 19 are provided in the modification of Figs. 7, 8 and 9. In this modification the filler elements 16 and 17 lock under the overhanging lips 20 and 21 on the post portion 22 of the mounting or seal which separates the openings 18 and 19, and the surfaces 24, 25, 26 and 27 of the respective flanges 4, 5, 6 and 7 press upon the panels 2 or 3 as before. The flanges 5 and 7 on one side of the panel edge receiving grooves 2 and 3 are separated by the openings 18 and 19 and by the resilient post 22 which also separates the openings 18 and 19 and which like the openings 18 and 19 lies to one side of the line joining the mid points of the base of the grooves 9 and 10. It is preferable as shown to have each of the openings 18 and 19 in separate quarter sections of the body of the mounting or seal 1. Part of the post 22 and one of the flanges 24 and 26 are disposed in each of these quarter sections of the seal. A central hollow 23 may be formed in this mounting if desired to provide greater motion and flexibility to the flanges. Also, a longitudinal slit 29 may be formed in this mounting on the side of the median plane through the grooves opposite from the filler elements for the purpose of attaching a trim strip of chromium or the like to the mounting. This is frequently done in automobile assemblies. A slit 29 can be formed as desired in any of the flanges 4, 5, 6 and 7 of all seals or mountings shown.

An advantage of the modification of Figs. 7 to 9 is that each mounting groove can be placed in the locked or gripping position separately by pressing into position its corresponding filler. For example, the seal can be fitted around the window glass 2 on a table and the window glass 2 can be placed in the groove 9 and the wedge element 16 locked into position. The unit thus formed can then be transported to the cut in the body frame and the window placed therein. Then the body frame edge or panel 3 can be fitted into the groove 10 and the wedge element 17 locked in position. One man is able to perform these operations without difficulty.

The mountings shown herein with the integral fillers or compression elements have been found to be a considerable improvement over prior developments with a filler or wedge strip that is not maintained in alignment. The hinge portion formed integrally with the filler and mounting body stiffens and restrains the filler longitudinally so that it does not stretch when pressed into place. This gives a filler with a constant cross-section and length and eliminates any necessity of a harder rubber filler when the seal is of a gum-like rubber compound which may be stretched in assembly to have non uniform cross section. At the same time this hinge maintains the wedge element in immediate alignment with the longitudinal opening and consequently eliminates any aligning operation. Finally, the mountings shown have uniform cross section and can all be extruded in a single piece. This minimizes problems of supply and assembly as previously noted.

Although the invention may be employed in various ways, only preferred embodiments have been illustrated and described. Other embodiments may be made within the invention as provided by the patent statutes.

This application is a continuation-in-part of application Serial No. 119,852, filed October 6, 1949, and assigned to the same assignee as the assignee of the subject application.

What I claim is:

1. A flexible linear mounting of rubberlike material for joining and sealing adjacent panel edges, comprising a body of uniform cross-section and of flexible material with two spaced grooves disposed therein, at least one longitudinal opening in said body portion between said grooves and on one side of a longitudinal plane passing through the midpoints of the base of said grooves, and filler for each of said longitudinal openings hinged with the mounting along one edge of said longitudinal openings, each opening and respective flexible filler being so proportioned that after the panel edges have been fitted into the spaced grooves the opening tightly receives its respective filler and the filler compresses the body of the rubberlike material against the portions of the panels in said grooves to hold them firmly and said filler is held in position by the body of the mounting pressing against it.

2. A flexible linear mounting of rubberlike material for joining adjacent panel edges comprising a body of uniform cross-section with two spaced and generally opposite grooves therein, a longitudinal opening in said body between said grooves, and a filler integrally hinged to said body along one edge of said opening, said opening and filler being so proportioned that after the panel edges have been fitted into the spaced grooves the opening tightly receives the filler and the flexible filler compresses portions of the body of the rubberlike material against the portions of the panels in said grooves to hold them firmly and said filler is held in position by the body of the mounting pressing against it.

3. A flexible linear mounting of rubberlike material for joining adjacent panel edges comprising a body of substantially uniform cross-section with two spaced and generally opposite grooves therein, a longitudinal opening in said body between said grooves with an overhanging lip along one edge, and a linear wedge-shaped element integrally hinged to said body along the opposite edge of said opening from said lip with a projecting bead along the outer portion of said wedge-shaped element on the opposite side from that on which said element is hinged, said opening and wedge-shaped element being so proportioned that after the panel edges have been fitted into the spaced grooves said wedge element fits tightly into said opening with the projecting bead on said wedge element fitting inside the overhanging lip of said opening, and said wedge element compresses the body of the rubberlike material against the portions of the panels in said grooves to hold them firmly and said element is held in position by the body of the mounting pressing against it.

4. A flexible linear mounting of rubberlike material for joining adjacent panel edges comprising a body of uniform cross-section with two spaced and generally opposite grooves therein, a longitudinal ovate opening in said body between said grooves with an overhanging lip along one edge, and a linear ovate filler integrally hinged and pivoted to said mounting along the opposite edge of said opening from said lip, said opening and said filler being proportioned so that said filler can be sprung into said opening thereby to compress portions of the body of the mounting around edge portions of panels in said grooves and to hold said edge portions firmly therein and to cause said filler to be held and locked in said hollow by resulting pressure exerted from the body of the mounting pressing against it.

5. A flexible linear mounting of rubberlike material for joining adjacent panel edges comprising a body of uniform cross-section with two spaced and generally opposite grooves therein, a longitudinal opening in one quarter section of said mounting and on one side of a plane passing through the midpoints of the base of said grooves, a longitudinal opening in the quarter section adjacent to the quarter section containing the first mentioned longitudinal opening and on the same side of a plane passing through the midpoints of the base of said grooves, a filler of rubberlike material integrally hinged to the mounting along the edge of the first mentioned longitudinal opening furthest removed from second mentioned opening, a filler integrally hinged to the mounting along the edge of the second mentioned longitudinal opening furthest removed from the first mentioned opening, and a relatively small hollow through the central portion of said mounting, said fillers and said longitudinal openings being proportioned so that said fillers can be sprung into said openings to thereby compress portions of the body of the mounting around edge portions of panels in said grooves and to hold said edge portions firmly therein and to cause said fillers to be held and locked in their respective openings by the pressure from the body of the mounting against them.

6. A flexible linear mounting of rubberlike material for joining adjacent panel edges comprising a body of uniform cross-section with two spaced and generally opposite grooves therein, a longitudinal opening in one quarter section of said mounting and on one side of a plane passing through the midpoints of the base of said grooves, a longitudinal opening in the quarter section adjacent to the quarter section containing the first mentioned longitudinal opening and on the same side of a plane passing through the midpoints of the base of said grooves, a filler integrally hinged to the mounting along the edge of the first mentioned longitudinal opening, a filler integrally hinged to the mounting along the edge of the second mentioned longitudinal opening, said fillers and said longitudinal openings being proportioned so that said fillers can be sprung into said openings to thereby compress portions of the body of the mounting around edge portions of panels in said grooves and to hold said edge portions firmly therein and to cause said fillers to be held and locked in their respective openings by the pressure from the body of the mounting against them.

7. A flexible linear mounting of rubberlike material for joining adjacent panel edges comprising a body of uniform cross-section with two spaced and generally opposite grooves therein, a longitudinal opening in one quarter section of said mounting and on one side of a plane passing through the midpoints of the base of said grooves, a longitudinal opening in the quarter section adjacent to the quarter section containing the first mentioned longitudinal opening and on the same side of a plane passing through the midpoints of the base of said grooves, a filler integrally line hinged to the mounting along the edge of the first mentioned longitudinal opening furthest removed from second mentioned opening, a filler integrally line hinged to the mounting along the edge of the second mentioned longitudinal opening furthest removed from the first mentioned opening, a central post of the mounting intermediate the aforementioned longitudinal openings wider at the outer portion than the inner portion and having beaded lips along the outer edges inside of which said fillers fit, and a relatively small hollow through the central portion of said mounting, said fillers and said longitudinal openings being proportioned so that said fillers can be sprung into said openings to thereby compress portions of the body of the mounting around edge portions of panels in said grooves and to hold said edge portions firmly therein and to cause said fillers to be held and locked in their respective openings by the pressure from the body of the mounting against them.

8. A flexible linear mounting of rubberlike material for joining adjacent panel edges comprising a body of uniform cross-section with two spaced and generally opposite grooves therein, a longitudinal opening in one quarter section of said mounting and on one side of a plane passing through the midpoints of the base of said grooves, a longitudinal opening in the quarter section adjacent to the quarter section containing the first mentioned longitudinal opening and on the same side of a plane passing through the midpoints of the base of said grooves, a filler integrally line hinged to the mounting along the edge of the first mentioned longitudinal opening furthest removed from second mentioned opening, a filler integrally line hinged to the mounting along the edge of the second mentioned longitudinal opening furthest removed from the first mentioned opening, a central post of the mounting intermediate the aforementioned longitudinal openings wider at the outer portion than the inner portion and having beaded lips along the outer edges inside of which said fillers fit, said fillers and said longitudinal openings being proportioned so that said fillers can be sprung into said openings to thereby compress portions of the body of the mounting around edge portions of panels in said grooves and to hold said edge portions firmly therein and to cause said fillers to be held and locked in their respective openings by the pressure from the body of the mounting against them.

9. The mounting of claim 5 provided with a longitudinal slit in which to hang trimming strips adjacent one groove and on the side of the plane passing through the midpoints of the base of the grooves opposite from the side of the plane of the longitudinal openings.

10. A flexible linear mounting of rubberlike material for joining adjacent panel edges comprising a body of uniform cross-section with two spaced and generally opposite grooves therein, a longitudinal opening in said body between said grooves, a relatively thin, narrow hinge longitudinally joined to one edge of said opening, and a filler joined to said hinge, said opening and filler being so proportioned that after the panel edges have been fitted into the spaced grooves the opening tightly receives the filler and the flexible filler compresses portions of the body of the rubberlike material against the portions of the panels in said grooves to hold them firmly and said filler is held in position by the body of the mounting pressing against it.

11. An integral connecting strip of elastic material having a main body portion, two wing portions and a strut portion, each of said wing portions and said body portion so arranged as to form a groove suitable for receiving a panel between each of said wing portions and said body portion, and to form a groove suitable for receiving said strut portion between said wing portions, said strut portion being connected at one end thereof to one of said wing portions by a pivot at one of the outer edges of the groove between said wing portions, and having arcuate bearing portions along its ends for mating with corresponding arcuate bearing portions in the groove, said pivot comprising a reduced portion integral with the strut portion and the wing portion to which it is connected, said reduced portion being thin relative to the size of said strut bearing portion on the end of the strut having said pivot, the width of the strut being sufficiently greater than the width of the strut receiving groove so that when the panels are within the panel receiving grooves and the strut is pivoted into its groove the wings are urged against the panels.

12. An integral connecting strip of elastic material having a main body portion, two wing portions, and at least one strut portion, each of said wing portions and said body portion so arranged as to form a groove suitable for receiving a panel between each of said wing portions and said body portion, and to form a groove suitable for receiving each of said strut portions between said wing portions, each strut portion being connected at one end thereof to one of said wing portions by a pivot at one of the outer edges of the groove between said wing portions, and having arcuate bearing portions along its ends for mating with corresponding arcuate bearing portions in the groove, said pivot comprising a reduced portion integral with the strut portion and the wing portion to which it is connected, said reduced portion being thin relative to the size of said strut bearing portion on the end of the strut having said pivot, the width of the strut being sufficiently greater than the width of the strut receiving groove so that when the panels are within the panel receiving grooves and the strut is pivoted into its groove the wings are urged against the panels.

HOWARD G. BECK.

REFERENCES CITED

The following references are of record in the file of this patent:

UNITED STATES PATENTS

| Number | Name | Date |
|---|---|---|
| 1,961,352 | Hall | June 5, 1934 |
| 2,288,329 | Smith | June 30, 1942 |
| 2,350,430 | Ulrich | June 6, 1944 |
| 2,492,566 | Geyer | Dec. 27, 1949 |